United States Patent [19]
Lindén

[11] Patent Number: 5,615,818
[45] Date of Patent: Apr. 1, 1997

[54] ARRANGEMENT IN A LOAD CARRIER

[75] Inventor: Claes-Göran Lindén, Gnosjö, Sweden

[73] Assignee: Industri AB Thule, Hillerstorp, Sweden

[21] Appl. No.: 79,605

[22] Filed: Jun. 22, 1993

[30] Foreign Application Priority Data

Jun. 24, 1992 [SE] Sweden ................... 9201934

[51] Int. Cl.⁶ ............................................. B60R 9/00
[52] U.S. Cl. ........................ 224/326; 224/321; 224/325
[58] Field of Search ............................... 224/326, 325, 224/309, 314, 319, 320, 321

[56] References Cited

U.S. PATENT DOCUMENTS

| | | | |
|---|---|---|---|
| 3,253,755 | 5/1966 | Bott | 224/324 |
| 4,222,508 | 9/1980 | Bott | 224/324 |
| 4,295,588 | 10/1981 | Kowalski et al. | 224/321 |
| 4,487,349 | 12/1984 | Kudo | 224/322 |
| 5,071,050 | 12/1991 | Pudney et al. | 224/321 |

FOREIGN PATENT DOCUMENTS

| | | |
|---|---|---|
| 3814799 | 2/1988 | Germany. |
| WO86/00584 | 1/1986 | WIPO. |
| WO91/08929 | 6/1991 | WIPO. |

OTHER PUBLICATIONS

Three-page European Search Report.

*Primary Examiner*—David J. Walczak
*Attorney, Agent, or Firm*—Novak Druce Reynolds Burt

[57] ABSTRACT

A load carrier roof-mounted on a vehicle has longitudinal so-called railings (2) with elongate, undercut spaces for anchorage bodies (8) which have anchorages (12, 30) for struts or other accessories extending between the railings. The anchorage bodies (8) have upper (11) and lower (10) parts which are separately insertable in the undercut space transversely of the longitudinal direction thereof. The parts (10 and 11) are, interiorly in the undercut space, combinable to form the anchorage body (8). A screw (16) between the parts (10 and 11) tightens these to expansion in the undercut space.

20 Claims, 5 Drawing Sheets

ARRANGEMENT IN A LOAD CARRIER

TECHNICAL FIELD

The present invention relates to an arrangement in such a load carrier for vehicles, for example a so-called roof railing, as has elongate, undercut accommodation spaces for anchorage bodies of greater transverse dimensions than the transverse dimension of the opening to the undercut space, the anchorage bodies, disposed in the undercut spaces, serving to fix accessories to the load carrier or to fix the load.

BACKGROUND ART

An arrangement of the type mentioned by way of introduction is previously known from SE-B-466 844. This publication shows a load carrier in the form of a so-called roof railing which has two profile bodies permanently fixed on the vehicle roof and approximately C- or U-shaped in cross section. These longitudinally directed profile bodies have undercut, longitudinal accommodation spaces for anchorage bodies which serve to fix pivotally disposed transverse struts which extend between the rails of the railing and are intended to carry a load.

According to this publication, insertion of the anchorage bodies in the longitudinal, undercut spaces is effected in that the forward or rear ends of the longitudinal profile bodies are exposed, whereafter the anchorage bodies are slid in in the longitudinal direction of the profile bodies and are anchored in desired positions.

The fact that the anchorage bodies must be slid in from open ends of the longitudinal profile bodies entails that the anchorage bodies as a rule cannot be retrofitted without major complications.

In similar contexts, there are also known in the art profile bodies disposed on vehicles and with longitudinal, undercut accommodation spaces for anchorage bodies which, for instance, are employed for load fixing. The insertion of the anchorage bodies is effected via openings which the profile bodies have where the undercut portions are removed. Such a solution entails an unacceptable weakening of the profile bodies.

Problem Structure

The present invention has for its object to realize an arrangement of the type mentioned by way of introduction, in which the arrangement is designed so that the anchorage bodies may be passed into the longitudinal profile bodies in optional position therealong and be anchored in the intended positions. The present invention further has for its object to realize an arrangement which requires no weakenings in the longitudinal profile bodies. Finally, the present invention also has for its object to realize an arrangement which is simple and economical to manufacture and which offers an extremely reliable fixing of the anchorage bodies in positions intended therefor in the profile bodies.

Solution

The objects forming the basis of the present invention will be attained if the arrangement is characterized in that the anchorage bodies have two or more parts which are separately insertable in the undercut space via the opening thereof, and are combinable interiorly in the undercut space to form the anchorage body.

Further advantages will be attained if the subject matter of the present invention in its various embodiments is also given one or more of the characterizing features as set forth in appended claims 2 to 13.

BRIEF DESCRIPTION OF THE ACCOMPANYING DRAWINGS

The present invention will now be described in greater detail hereinbelow, with particular reference to the accompanying Drawings. In the accompanying Drawings.

DESCRIPTION OF PREFERRED EMBODIMENT

Figure 1:
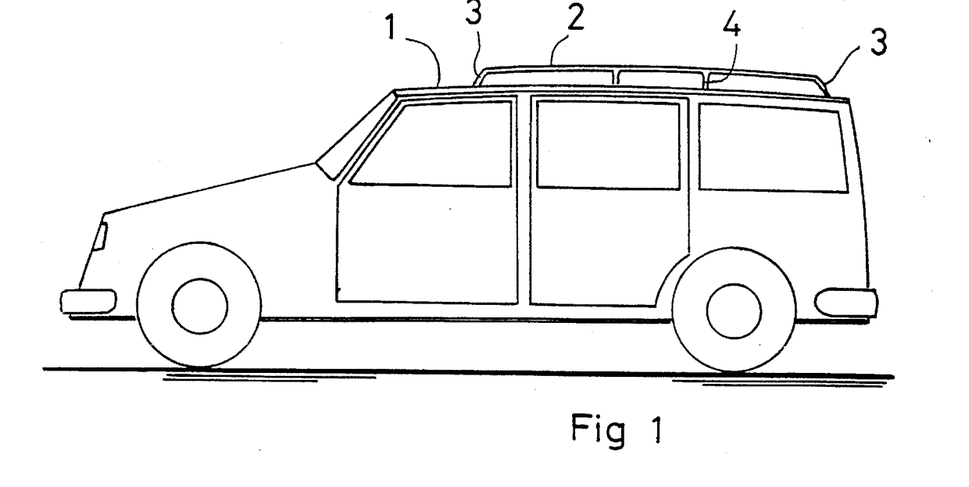
FIG. 1 is a side elevation of a vehicle which is fitted with a load carrier according to the present invention.

FIG. 1 shows from the side a vehicle which, on its roof 1, has permanently secured, longitudinal load carriers. These comprise longitudinal profile bodies 2 which, via forward and rear feet 3, are secured in the vehicle roof 1 and which may also have additional feet 4 between the forward and rear ends. Such a load carrier permanently secured on a vehicle roof 1 is often called a roof railing.

Figure 2:
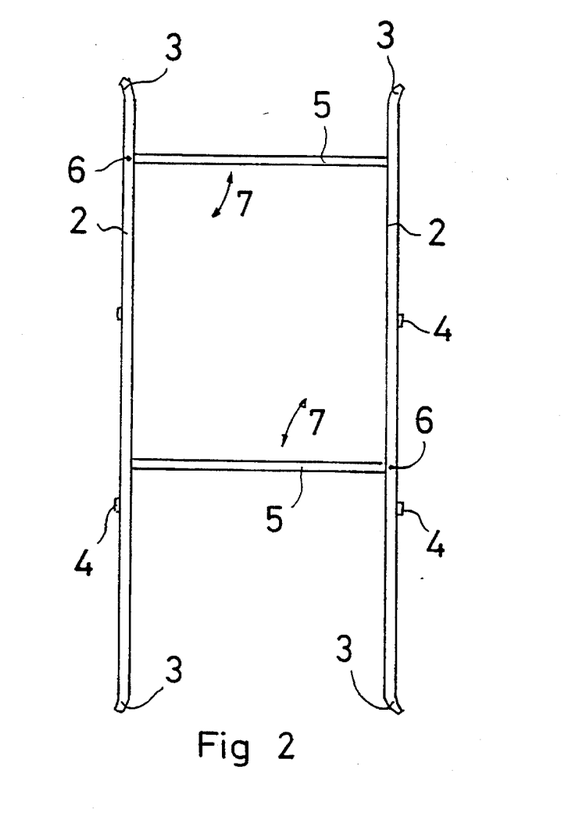
FIG. 2 is a top plan view of the load carrier of FIG. 1.

When the load carriers are put to use, these are provided with transverse struts 5 which, in this embodiment, are pivotal via joints 6 in a horizontal plane as shown by the double-headed arrow 7 so that the struts are inwardly pivotal from the position of use illustrated in FIG. 2 to positions along or interiorly in the longitudinal profiles 2 when the load carrier is not in use. In order for such inward pivoting of the transverse struts 5 into the longitudinal profile bodies 2 to be possible, these profile bodies are of open cross section in towards the centre of the vehicle and may be substantially C-shaped, U-shaped or the like.

In the embodiment illustrated in FIGS. 1 and 2, the joints 6 are disposed on anchorage bodies 8 which are insertable in longitudinal accommodation spaces interiorly in the longitudinal profiles 2.

Figure 3:
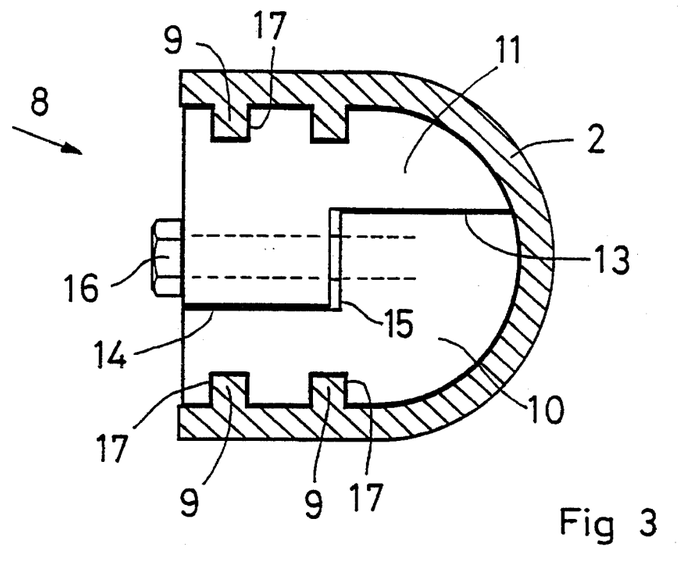
FIG. 3 is a vertical schematic cross section through the one longitudinal profile body of the load carrier, the section being taken approximately along the line A—A in FIG. 4.
Figure 4:
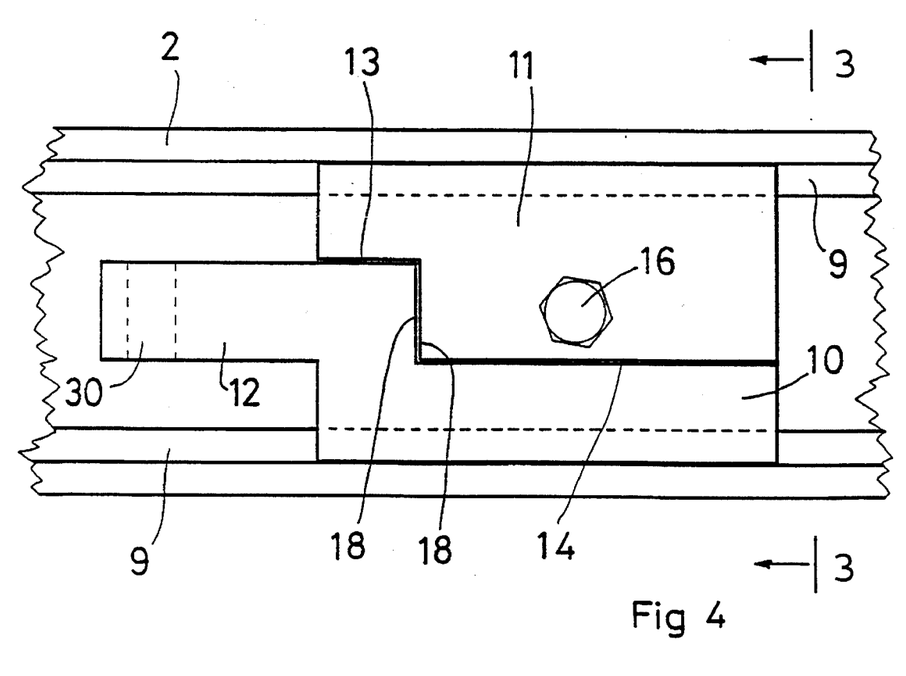
FIG. 4 is a view of the profile body with an anchorage body placed therein, seen in the horizontal direction from the centre line of the vehicle out towards the profile body.

FIGS. 3 and 4 show a first embodiment of a longitudinal profile body 2 and an anchorage body 8 mounted therein. It will be apparent that the profile body 2 is of substantially U-shaped cross section where the opening is turned in towards the centre of the vehicle 1. For purposes of rigidification, the profile body has interior, longitudinal projections or strips 9 which also serve to fixedly secure the anchorage body 8.

The anchorage body 8 is divided into two parts, a lower part 10 and an upper part 11 which together are of a configuration which is approximately complementary to at least the major portion of the undercut space which the profile body 2 has thanks to the inwardly directed projections 9. The height or transverse dimension of each part 10 and 11 is less than the height or transverse dimension of the opening adjacent the undercut space, i.e. the free space into the longitudinal, undercut space of the profile body 2. In the embodiment according to FIG. 3, this entails that the height of the bodies 10 and 11 should be less than the distance between mutually registering projections 9. As a result of this dimensioning and design of the parts 10 and 11, these can separately be inserted in a horizontal direction transversely of the longitudinal direction of the profile body 2 into the undercut space thereof.

When they are finally inserted in the body, the parts 10 and 11 can then be displaced in the longitudinal direction of the profile body to the position illustrated in FIGS. 3 and 4.

In its one end, the lower profile body part 10 has a projection 12 with a bore 30 which serves to accommodate that stub shaft which is included in the joint 6. The projection 12 is placed in the vertical direction centrally in the space of the profile body so that thereby the strut 5 with two parts can straddle the projection and be pivotal about the projection.

In the embodiment according to FIGS. 3 and 4, the anchorage body 8 has two mutually approximately parallel joint faces 13 and 14 of vertical surfaces 15 which are in slight spaced apart relationship. Approximately at right angles to the two vertical surfaces 15, there extends a free bore in the upper part 11 for a screw 16, and a threaded bore in the lower part 10 for accommodating the screw. Furthermore, the lower and upper parts 10 and 11 respectively, are provided, on their upwardly and downwardly facing sides, with grooves 17 for accommodating the projections 9 of the profile body. The grooves 17 are preferably complementary to the projections or strips 9 and are dimensioned in such a manner that the two parts 10 and 11 may readily be slid in the longitudinal direction of the profile body 2 without, to that end, the need for any exaggerated play or clearance. With that placement of the parts 10 and 11 as shown in FIG. 3, it will be understood that, on tightening of the screw 16, the parts will be drawn towards one another in the horizontal direction. This implies that the lower part 10 is drawn in a direction to the left in the Figure, while the upper part 11 is drawn in a direction to the right. Consequently, the surfaces of the parts 10 and 11 defining the grooves 17 will be forced into tight abutment against the side surfaces of the projections 9 of the profile body 2 so that thereby the anchorage body 8 is positionally fixed in the profile body.

It should be emphasized that the clamping effect which occurs is directed transversely of the longitudinal direction of the profile body, and so there is no risk that the anchorage body 8 be displaced in the longitudinal direction of the profile body on tightening. Thus, it is easy to place and lock the anchorage body 8 in an intended position.

The horizontal clamping effect which is employed for positionally fixing the anchorage body 8 also implies that the profile body 2 runs no risk of being deformed such that, under the action of the clamping force, its both shanks are bent away from one another so that thereby the anchorage body 8 might run the risk of coming loose.

It will be apparent from FIG. 4 that the interfaces between the two parts 10 and 11 of the anchorage body 8 also have vertical abutment surfaces 18 which are brought into abutment against one another when the parts 10 and 11 are displaced in the longitudinal direction of the profile body to the intended mounting position. By such abutment between the abutment surfaces 18, alignment of the parts will be facilitated, as well as insertion of the screw 16.

DESCRIPTION OF ALTERNATIVE EMBODIMENTS

Figure 5:
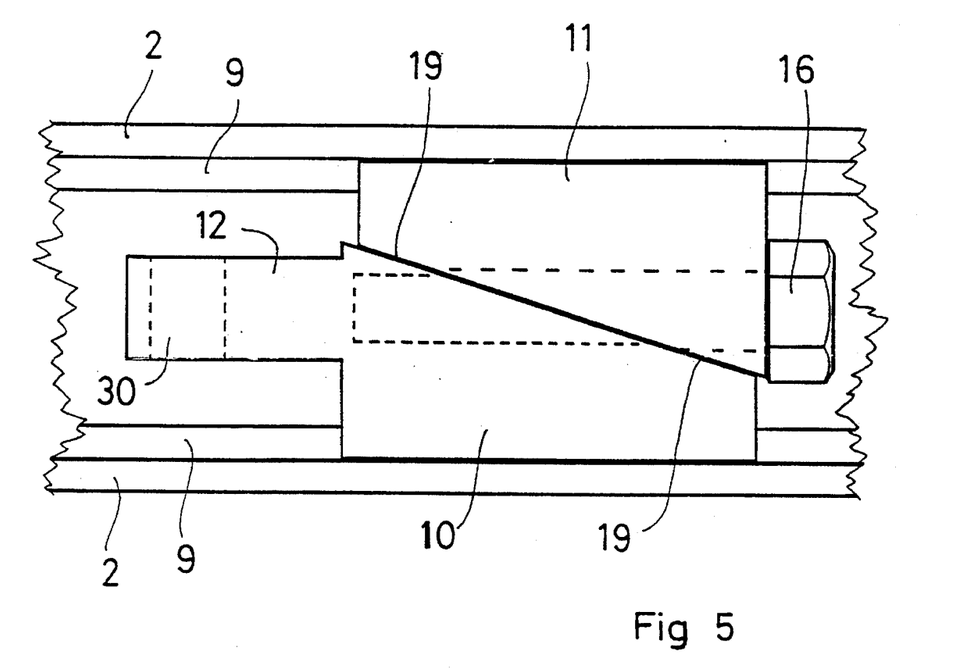
FIG. 5 shows a second embodiment of the present invention in a view corresponding to that of FIG. 4.

FIG. 5 shows one modified embodiment of the anchorage body 8, which is placed in the same type of profile body as that shown in FIG. 3.

Also in this embodiment, the anchorage body 8 is divided into a lower part 10 and an upper part 11. In this embodiment, the parts 10 and 11 are cuneiform and have their mutually facing surfaces designed as oblique ramp surfaces 19 which incline in the longitudinal direction of the profile body 2. This entails that, on displacement of the upper part 11 of the anchorage body 8 in a direction to the left in the Figure, the transverse dimension of the anchorage body will increase in the vertical direction while being correspondingly reduced on displacement in the opposite direction. In order to achieve such displacement, use is made of a screw 16 which extends through a free bore in the upper part 11 and which is in mesh with a threaded bore in the lower part 10.

The mutually recumbent ramp surfaces 19 of the parts 10 and 11 may be completely planar but may also be provided with mutually engaging strips and grooves which, thus, extend in the longitudinal direction of the profile body 2. As a result of such mutually engaging strips and grooves, displacement will be prevented of the parts 10 and 11 at right angles to the plane of the Drawing in FIG. 5, at the same time as the longitudinal displacement along the profile body 2 is permitted.

Another variation of an anchorage body 8 which is divided into two cuneiform parts could be, in FIG. 3, to direct counterparts to the ramp surfaces 19 so that these extend between the left-hand edge of the lower joint face 14 and the right-hand edge of the upper joint face 13. In such a variation, the expansion which realises the displacement movement between the parts takes place in the longitudinal direction of the struts 5, i.e. transversely of the longitudinal direction of the profile body 2.

Figure 6:
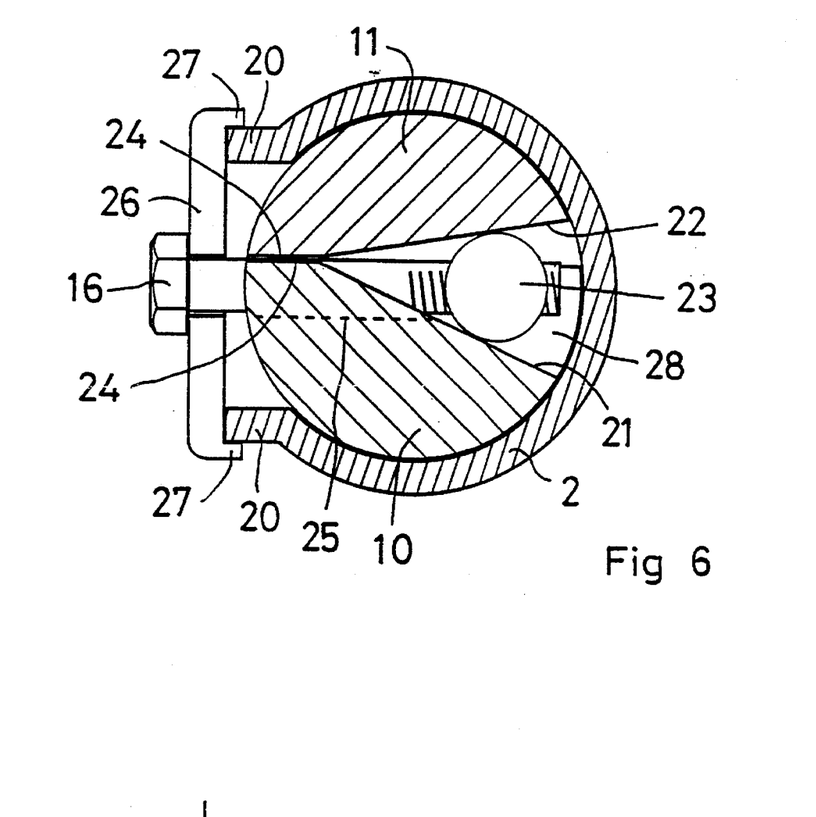
FIG. 6 shows a third embodiment of the present invention in a cross section corresponding to the section of FIG. 3 and in a position according to the section line B—B in FIG. 7.
Figure 7:
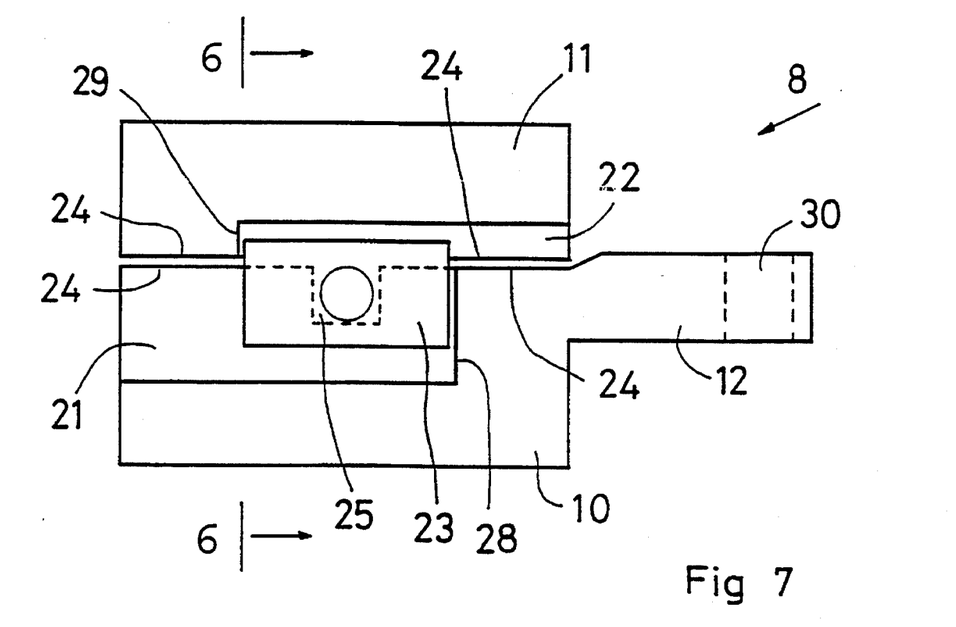
FIG. 7 is a view of the anchorage body of FIG. 6 seen in a direction from right to left in this Figure.

In the embodiment according to FIGS. 6 and 7, use is made, by way of exemplification, of a profile body 2 of different design. This profile body is of substantially cylindrical cross section, which has a longitudinal aperture defined by two mutually approximately parallel shanks 20.

Also in this embodiment, the anchorage body 8 is composed of a lower part 10 and an upper part 11. Together, both of these parts substantially are of an outer configuration which is complementary to the interior configuration in the profile body 2 and is, therefore, as good as cylindrical exteriorly. On their mutually facing sides, the parts 10 and 11 have obliquely inclined ramp surfaces 21 and 22 whereby there is formed, between the parts 10 and 11, a cuneiform accommodation space for a clamping body 23 which may be in the form of a short cylinder. At the tip of the cuneiform accommodation space, the parts 10 and 11 have mutually recumbent, substantially planar abutment surfaces 24 which may be parallel with a diameter plane of the anchorage body 8. The abutment surfaces 24 are displaced away from the diameter plane a distance which corresponds approximately to half of the diameter of that screw 16 which engages in the clamping body 23 and is intended to draw this in towards the tip of the cuneiform accommodation space. Hereby, the shaft of the screw 16 will be countersunk in a recess 25 in the abutment surface 24 of the lower part 10 and in the obliquely inclined ramp surface 21 of the lower part 10.

On tightening of the screw 16, the clamping body 23 is drawn into the cuneiform accommodation space between the parts 10 and 11. Hereby, these will be forced away from one another and into hard abutment against the inner defining surfaces of the profile body 2. In order to prevent the profile body from being deformed in this instance such that the shanks 20 are forced away from one another, use is suitably made of a yoke 26 provided with a hole through which the screw extends and which has strips 27 which grasp about the outside of the shanks 20.

In order to position the upper part 11 in the longitudinal direction of the anchorage body 8, the cuneiform accommodation space which is formed between the ramp surfaces 21 and 22 has transverse surfaces 28 and 29 which may be brought into abutment with the end surfaces of the clamping body 23.

Also in this embodiment, the lower part 10 of the anchorage body has a projection 12 with a bore 30 for the joint 6.

Figure 8:
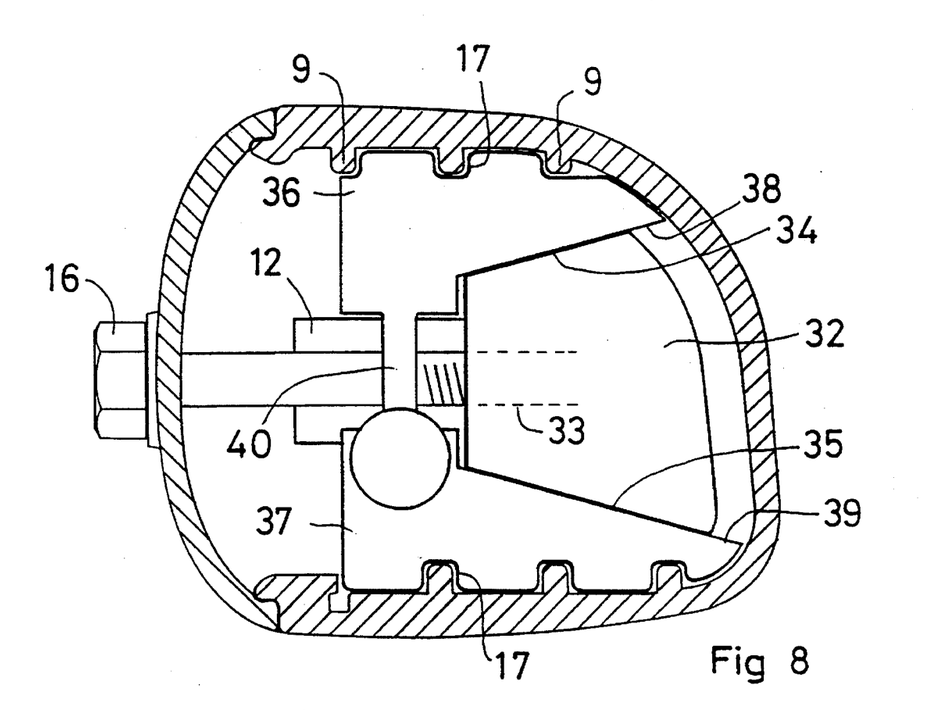
FIG. 8 shows a fourth embodiment of the present invention in a view corresponding to those of FIGS. 3 and 6.
Figure 9:
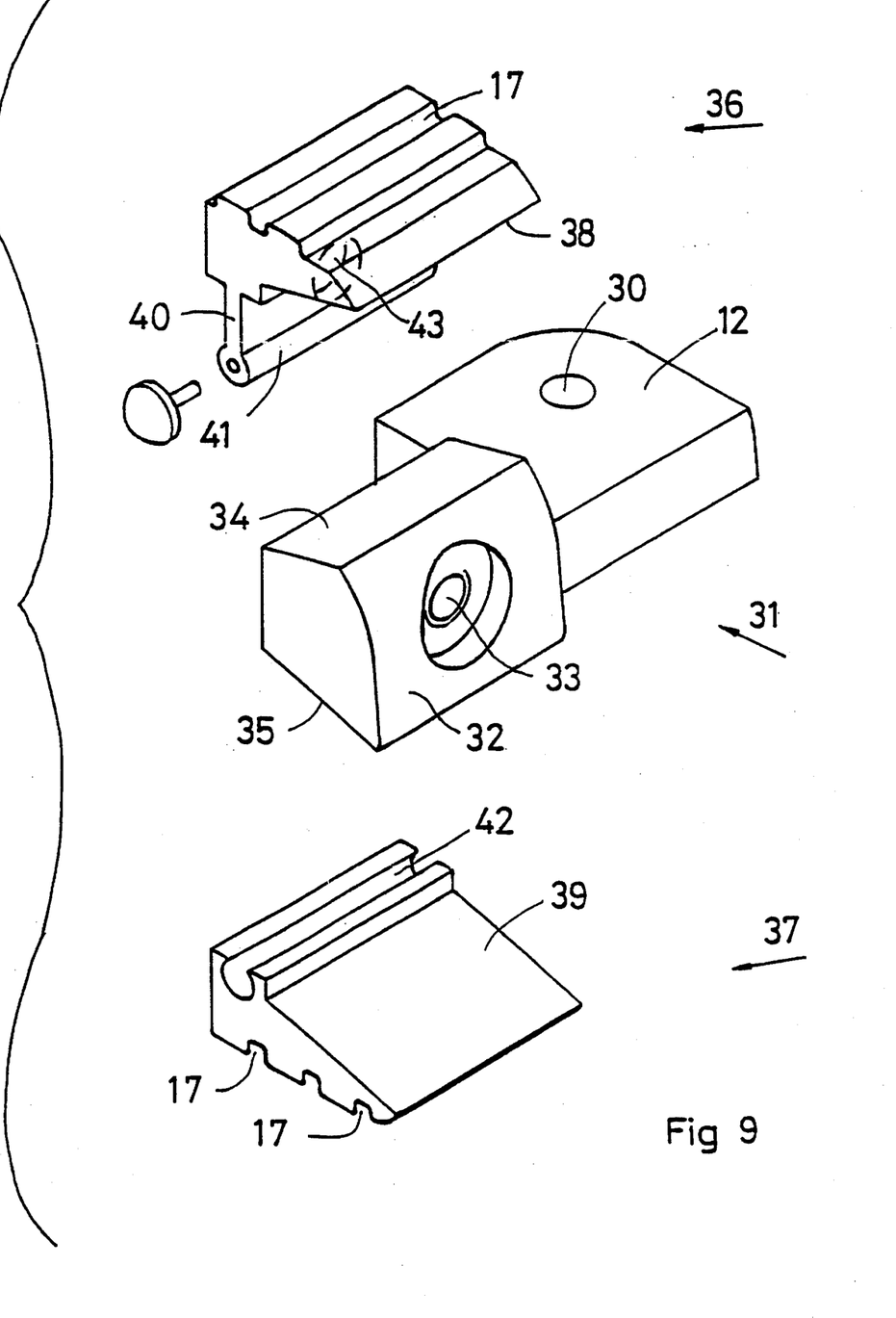
FIG. 9 is an exploded view illustrating parts included in the construction according to FIG. 8.

In yet a further embodiment which is shown in FIGS. 8 and 9, the anchorage body 8 has been divided up into three different subcomponents. These consist of a main component 31 which carries the laterally protruding projection 11 for the pivotal anchorage of the strut 5 either at the joint 6 via the bore 30 or via a suitable coupling device on the free end of the strut 5. The main component 31 includes, in the opposing end, a cuneiform portion 32 which has a threaded bore 33 whose longitudinal direction is transverse to the longitudinal direction of the profile body 2 and approximately horizontal in the mounted position. The longitudinal direction of the threaded bore will, therefore, be approximately parallel with the longitudinal direction of the transverse strut 5. Furthermore, the main component 31 has an upper ramp surface 34 and a lower ramp surface 35 which converge in a direction towards one another in a direction in towards the centre of the vehicle.

In this embodiment, the anchorage body further comprises an upper clamping jaw 36 and a lower clamping jaw 37. Both of these clamping jaws have, on their upper and lower surfaces, respectively, a configuration which is substantially complementary to the corresponding interior configuration of the profile body 2, and consequently the clamping jaws have longitudinal grooves 17 for cooperation with the longitudinal projections 9 of the profile body 2. Furthermore, both of the clamping jaws are provided with ramp surfaces 38 and 39, respectively, for abutment against the upper and lower ramp surfaces 34 and 35, respectively of the main component.

The upper clamping jaw 36 is provided, along its edge facing towards the centre of the vehicle, with a downwardly directed projection 40 whose longitudinal direction is substantially parallel with the longitudinal direction of the profile body 2. The lower end of this projection has a substantially circular, bead-like formation 41 which serves as a joint in connection with the partly circular groove 42 which is disposed in the upper side of the lower clamping jaw 37. The two clamping jaws are designed in such a manner that, in the longitudinal direction of the profile body 2, they may be slid together and can be displaced on the cuneiform part 32 with the upper clamping jaw 36 on the upper side of the cuneiform portion and with the lower clamping jaw 37 on the lower side thereof. Furthermore, in this position it will be possible for the clamping jaws to be pivoted about the joint 41 and, of course, the groove 17 of the clamping jaws to accommodate the strips 9 of the profile body 2.

In the forwardly directed projection 40, the upper clamping jaw has a through bore 43 through which extends a screw 16 into the threaded bore 33 in the cuneiform portion 32. The opposite end of the screw 16 has a head which is located on the outside of a masking strip 26 or a yoke of the type which was described with reference to FIG. 6.

The arrangement is such that, on tightening of the screw 16, the cuneiform portion 32 will be drawn in between the clamping jaws at the same time as these are prevented from moving in the same direction, as a result of the engagement between the groove 17 and the strips 9, for which reason the clamping jaws are pivoted about the joint device 41 and expand outwardly towards the inside of the profile body 2 so that the anchorage body 8 is positionally fixed in the profile body 2.

The embodiment may be modified such that the cuneiform portion is turned to face in the opposite direction, so that the ramp surfaces 34 and 35 converge in a direction out from the longitudinal centre line of the vehicle. In such an embodiment, the two clamping jaws 36 and 37 would also be reversed and located on the outside of the cuneiform portion 32. That screw which is employed in such an embodiment clamps between the side of the cuneiform portion 32 facing towards the centre of the vehicle and a nut or other suitable threaded member which is located on the outside of the downwardly directed projection 40 of the clamping jaw 36.

In all of the above-described embodiments, the projection 12 to the joint 6 or to a coupling device intended for fixedly coupling the free end of the transverse strut 5 in the opposing profile body 2 was placed interiorly in the undercut space of the profile body. Naturally, this is not necessary, but the anchorage point of the joint 6 or the coupling device may also be placed on that side of the anchorage body 8 which faces in towards the centre of the vehicle roof. Hereby, the joint 6 or coupling device will be located outside the profile bodies 2.

Even if the invention is applied advantageously to a load carrier of the type shown in FIGS. 1 and 2, it is obvious to a person skilled in the art that no pivotal anchorage of struts 5 with joints 6 need be employed. Thus, the anchorage bodies 8 may be provided with any optional suitable type of fixing devices for cooperation with struts 5, other types of accessories to the load carrier or quite simply just a lug or similar device for fixing the load.

In one variation of the embodiment according to FIGS. 6 and 7, the anchorage body 8 may be divided approximately along a diameter plane and have obliquely inclined ramp surfaces at each end of this diameter plane so that thereby the substantially cylindrical anchorage body will, at its opposing ends, have inwardly tapering cuneiform accommodation spaces for clamping bodies corresponding to the clamping body 23. These clamping bodies are drawn towards one another with the aid of a longitudinal screw which is accommodated in suitable axial grooves in mutually facing surfaces on parts of the anchorage body. On tightening of such a screw so that the clamping bodies are drawn into the cuneiform spaces, both parts of the anchorage body will be forced away from one another so that the anchorage body is thereby fixedly clamped and positionally fixed interiorly in the profile body.

In yet a further alternative, the anchorage body 8 may be provided with a portion which, in the inserted and mounted position in the profile body, substantially fills out the cross section thereof. The extent in the longitudinal direction of the profile body of this particular part of the anchorage body is less than the transverse dimension at the opening to the accommodation space of the profile body. Hereby, this part of the anchorage body can be turned through 90° about an axis which is parallel with the longitudinal direction of the strut 5 and then be withdrawn through the opening of the profile body or inserted the same way. In the inserted position in the profile body, a second part of the anchorage body 8 is then secured on the first, so that the anchorage body will thereby be of such great length in the longitudinal direction of the profile body 2 that the above-mentioned rotation and withdrawal are prevented. Fixed locking of the anchorage body may, in this embodiment, be realised by a screw which is accommodated in a threaded bore in the anchorage body and which extends into abutment against an interior defining surface in the profile body.

The same anchorage principle in which the screw 16 acts against an interior surface in the profile body 2 may also be employed in other embodiments, for instance the embodiment according to FIGS. 3 and 4.

Further modifications of the present invention may be made without departing from the spirit and scope of the appended claims.

What is claimed is:

1. An anchorage arrangement for anchoring an accessory to a vehicle load carrier, the arrangement comprising:

a railing having at least one elongate, undercut accommodation space, the space being defined by walls of the railing and an opening in the railing, the opening having a first transverse dimension;

at least one anchorage body having a greater transverse dimension than the first transverse dimension of the opening, the anchorage body including a top and a bottom portion, the top and bottom portions each having transverse dimensions less than the first transverse dimension to permit separate insertion of the top and bottom portions into the space through the opening, the top and bottom portions fitting together to form the anchorage body; and a face of the top portion of the anchorage body contacting a top wall of the space and a face of the bottom portion of the anchorage body contacting a bottom wall of the space when the top and bottom portions are fit together to form the anchorage body inside of the space.

2. The arrangement as claimed in claim 1, wherein the top and bottom portion of the anchorage body are individually movable into and out of the space, through the opening, in an insertion direction transverse to a longitudinal direction of the space.

3. The arrangement as claimed in claim 2, wherein the railing includes one or more longitudinally directed projections extending into the space and the anchorage body includes one or more recesses for accommodating the projections on the railing.

4. The arrangement as claimed in claim 3, wherein the anchorage body includes a clamping device for moving the top and bottom portions of the anchorage body toward and away from each another such that the recesses of the anchorage body cooperate with the projections of the railing to fixedly clamp the anchorage body in the space.

5. The arrangement as claimed in claim 4, wherein the clamping device moves the top and bottom portions in a direction which is substantially parallel with the insertion direction.

6. The arrangement as claimed in claim 2, wherein the anchorage body has a first portion having transverse dimension in a first direction that is less than the transverse dimension of the opening of the undercut space and having a transverse dimension in another direction making approximately a right angle with the first direction and that is also greater than the transverse dimension of the opening, whereby the first portion is insertable in the undercut space and therein rotatable through approximately 90°; and wherein a second portion of the anchorage body is insertable in the undercut space and therein combinable with the first portion so that the anchorage body has greater transverse dimensions than the opening.

7. The arrangement as claimed in claim 2, wherein the anchorage body includes an anchorage for fixing an end of a strut thereto.

8. The arrangement as claimed in claim 7, wherein the anchorage permits pivotal movement of a strut fixed thereto in a substantially horizontal plane.

9. The arrangement as claimed in claim 1, wherein the railing includes one or more longitudinally directed projections extending into the space, and the anchorage body includes one or more recesses for accommodating the projections on the railing.

10. The arrangement as claimed in claim 9, wherein the anchorage body includes a clamping device for moving the top and bottom portions of the anchorage body toward and away from each another such that the recesses of the anchorage body cooperate with the projections of the railing to fixedly clamp the anchorage body in the space.

11. The arrangement as claimed in claim 1, wherein the anchorage body comprises two cuneiform parts, each cuneiform part having an oblique ramp surface, wherein the ramp surfaces being arranged to be in abutting engagement with one another so that when the cuneiform parts are moved one toward the other, the transverse dimension of the anchorage body increases.

12. The arrangement as claimed in claim 11, wherein the oblique ramp surfaces extend in a longitudinal direction of the undercut space.

13. The arrangement as claimed in claim 11, wherein the oblique ramp surfaces extend in a transverse direction of the undercut space.

14. The arrangement as claimed in claim 1, wherein the top and bottom portions of the anchorage body are provided with mutually facing recesses which together form a cuneiform space therebetween; the arrangement further includes a clamping device engaged with a clamping body for retracting the clamping body into the cuneiform space thereby increasing the transverse dimension of the anchorage body.

15. The arrangement as claimed in claim 14, wherein a clamping direction of the clamping body is substantially parallel with a longitudinal direction of the elongate undercut space.

16. The arrangement as claimed in claim 14, wherein a clamping direction of the clamping body is substantially transverse to the longitudinal direction of the elongate undercut space.

17. The arrangement as claimed in claim 1, wherein the anchorage body further comprises:

a first portion having a transverse dimension in a first direction that is less than the transverse dimension of the opening of the undercut space and having a transverse dimension in another direction making approximately a right angle with the first direction and that is also greater than the transverse dimension of the opening, whereby the first portion is insertable in the undercut space and therein rotatable through approximately 90°; and wherein a second portion of the anchorage body is insertable in the undercut space and therein combinable with the first portion so that the anchorage body has greater transverse dimensions than the opening.

18. The arrangement as claimed in claim 1, wherein the anchorage body includes an anchorage for fixing an end of a strut thereto.

19. The arrangement as claimed in claim 18, wherein the anchorage permits pivotal movement of a strut fixed thereto in a substantially horizontal plane.

20. The arrangement as claimed in claim 1, wherein the top and bottom portions fit together to form the anchorage portion in the space when one of the top and bottom portions is moved toward the one other of the top and bottom portions in a longitudinal direction of the space.

* * * * *